INVENTORS.
Harvey Ellsworth Engkjer
Jack Alvin Furlong
Ralph Steffen Zebarth
BY
Hovey, Schmidt, Johnson & Hovey
ATTORNEYS.

United States Patent Office 3,218,668
Patented Nov. 23, 1965

3,218,668
FEATHER PICKING METHOD
Harvey Ellsworth Engkjer, Shawnee Mission, Kans., and Jack Alvin Furlong, Raytown, and Ralph Steffen Zebarth, Hickman Mills, Mo., assignors to Gordon Johnson Company, Kansas City, Mo., a corporation of Missouri
Filed Jan. 3, 1964, Ser. No. 335,496
4 Claims. (Cl. 17—45)

This invention relates to a new and improved method of removing feathers from poultry, which represents distinct departures from processes and equipment heretofore used in this field.

The primary object of the present invention is to provide for feather picking that effectively removes the feathers without need for successive steps of reverse picking as has heretofore been required.

It is an important object of the instant invention to provide improvements in feather picking based upon the principle of spinning the feathers from the bird and upon involvement of the feathers with flexible picking fingers in a manner to leave the bird clean and undamaged.

A further object of our invention is to provide a number of groups of feather-picking fingers so arranged and rotated that they shift the bird about in a number of directions so that during the feather-picking operation the bird assumes various positions with respect to the fingers, subjecting all of the feathers to the action of the fingers.

Another object of the present invention is to pick feathers by applying circular forces of short duration to and along the surface of the bird through use of parts that will become frictionally interengaged with the feathers so as to rapidly pull and spin the feathers from the bird in a single pass or step.

A still further object of the present invention is the provision of a method for picking all of the feathers from a bird in the manner described without barking the bird or otherwise damaging the various parts of the bird.

A still further object of the invention about to be described is to solve the universal problem in this field of removing feathers from areas of the bird that are normally inaccessible to the feather-removing instrumentalities.

In the drawings:

FIG. 5 is a fragmentary view of an alternate drive mechanism for rotating the elements having the picking fingers thereon.

Figure 1:
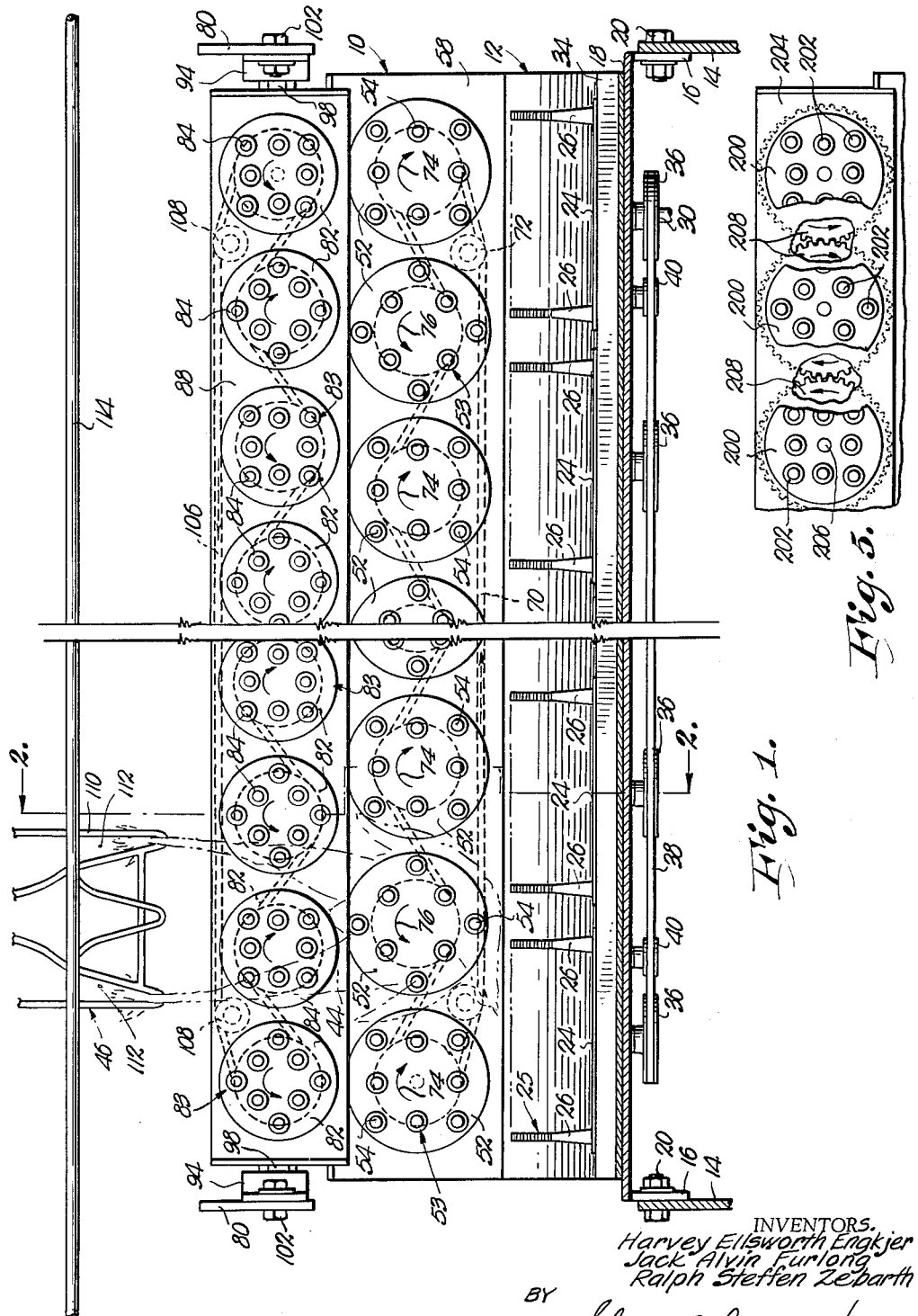
FIGURE 1 is a view of the feather-picking apparatus made pursuant to the present invention, and capable of carrying out our new method, taken along line 1—1 of FIG. 2, and illustrating a bird being defeathered by picking fingers mounted on rotatably driven, disc-like elements.

Feather-picking machine 10 includes an elongated, transversely U-shaped support 12 adjustably mounted on a base 14 for up-and-down movement by virtue of a number of slotted legs 16 rigid to and depending from the bight 18 of support 12. Bolts 20 passing through the slots of legs 16 secure the latter and thereby support 12 to base 14.

Figure 4:
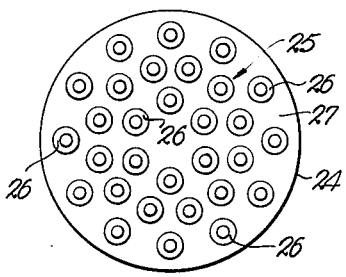
FIG. 4 is a view showing the inner face of one of the picking units.

A first set of picking members 22 is carried on support 12 at bight 18 thereof. Each member 22 includes a rotatable disc-like element 24 having a pair of opposed surfaces 27 and 29 intersecting the axis of rotation thereof and a picking body 25 comprised of a number of flexible, spaced-apart picking fingers 26, each of the latter being secured at one end thereof to element 24 and projecting outwardly from surface 27. As shown in FIG. 4, fingers 26 are disposed substantially symmetrically about the central axis of element 24 so that the longitudinal axis of body 25 is aligned with the axis of rotation of element 24.

Figure 2:
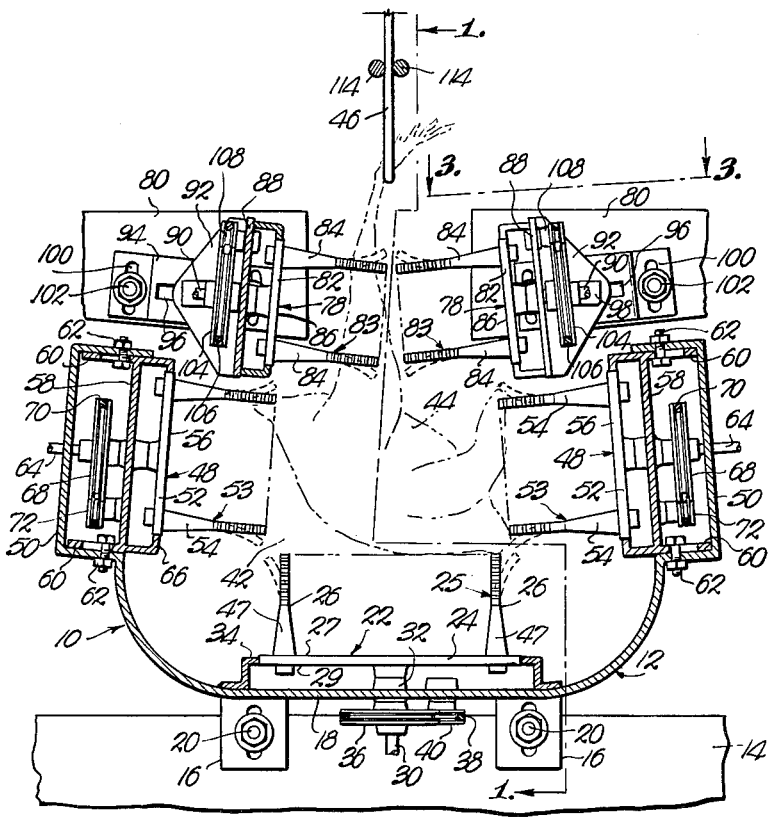
FIG. 2 is a cross-sectional view taken along line 2—2 of FIG. 1.

A shaft 30 is provided for each element 24 for mounting the latter on bight 18 for rotation about a substantially vertical axis. Bearing means 32 is provided for each shaft 30 respectively, and is carried by bight 18 as shown in FIG. 2. A guide plate 34 surrounds elements 24 and spaces the latter apart along the length of support 12. A pulley 36 is rigid to each shaft 30 repsectively, and structure, such as a flexible, endless belt 38, is drivingly coupled with coplanar pulleys 36 and a pair of idler pulleys 40 coplanar with pulleys 36. As belt 38 moves in one direction, alternate pulleys 36 and thereby alternate shafts 30 rotate in the same direction, while pulleys 36 and the corresponding shafts 30 adjacent such alternate pulleys, rotate in the opposite direction. Hence, the fingers 26 on one element 24 will rotate about their corresponding axis in one direction, while the fingers 26 on the adjacent element 24 rotate about their axis in the opposite direction. A suitable prime mover may be coupled with one of the shafts 30 to in turn rotate all of the remaining shafts 30 simultaneously. Also, adjacent elements 24 need not necessarily be rotated in opposite directions.

The upper, free ends of fingers 26 present the lowermost boundary of a bird-receiving passage or space 42, and the free ends of the fingers are disposed for engaging the proximal parts of a bird 44 as the latter passes through space 42 under the influence of conveying means 46 disposed above and in vertical alignment with members 22 as seen in FIGS. 1 and 2. As elements 24 rotate, the free ends of fingers 26 fan out or are urged radially outwardly relative to their axes of rotation by centrifugal force and tend to assume the dashed-line positions shown in FIG. 2. In these positions, and as the bird moves through space 42, fingers 26 penetrate the feathers and the latter will thus be disposed, at least momentarily, a short distance into the spaces between fingers 26. The feathers will be rubbed or brushed by fingers 26 as the latter frictionally engage the feathers and as elements 24 continue to rotate.

The outer, free ends of fingers 26 have longitudinally spaced, transverse ribs to provide roughened side surfaces which more effectively fritcionally engage the feathers and pull the same from the bird. As the feathers are disposed within the spaces between the fingers, they will be frictionally engaged by the sides of fingers 26 and continued rotation of fingers 26 will cause an intervolving of the feathers and fingers. As a result, the feathers will be pulled or spun from the bird since fingers 26 will be rotating at a high speed. Any feathers clinging to the fingers will subsequently be thrown therefrom by centrifugal force. The ribbed, side surfaces of fingers 26 aid in causing the intervolving of the feathers with the fingers 26 by increasing the frictional force between the feathers and the fingers. Thus, the feathers on those parts of the bird exposed to fingers 26 will be cleanly plucked from the bird as each set of fingers 26 revolves as a unit about the longitudinal axis of the corresponding body 25.

The counter-rotation of adjacent members 22 facilitates the feather removal because the feathers on different parts of the bird do not lay along the outer skin surface of the bird in the same manner. One group of feathers may lay in one direction and other groups of feathers may lay in completely different directions. By rotating one set of fingers 26 in one direction, certain feathers will be subjected to the spinning action imparted thereto by the fingers, while other feathers will be substantially unaffected by these same fingers. However, the feathers unaffected by the first set of fingers will be subjected to the spinning action of an adjacent set of fingers since these latter fingers will be rotating in the opposite direction and along the proper paths to cause the feathers to become intervolved with the fingers. All of the feathers exposed to fingers 26 will thus be spun from the bird. In this way, the bird will be cleanly defeathered, regardless of the lay of the feathers along the surface of the bird.

Each finger 26 has a relatively rigid stretch 47 adjacent the end thereof coupled with element 24 which tends to sustain the finger in its normal position extending laterally from element 24 as the latter is rotated and as the free ends of the finger are bent radially outwardly. When the rotation of fingers 26 ceases, each finger will return to its equilibrium position extending upwardly from surface 27 in a substantially longitudinally straight condition.

Although picking members 22 have been described as being capable of plucking feathers from a bird as the latter is conveyed past members 22 by conveying means 46, the bird need not necessarily be conveyed in this manner but may be manually held and placed on a member 22 as the latter is rotated so as to effect the plucking of the feathers from the bird. The size of the member 22 may be greater than that of the bird so that the entire bird will be contacted by the corresponding fingers and will be shifted about by the rotation of the fingers.

A second set of picking members 48 is disposed on opposed sides of space 42 and defines the lower side boundaries of the latter as is clear in FIG. 2. Members 48 are coupled to the upper ends of support 12 by virtue of substantially C-shaped extensions 50 forming a part of support 12 and illustrated clearly in FIG. 2. Each of the members 48 is substantially of the same construction in all respects as member 22 and includes a rotatable, disc-like element 52 having a surface 56 intersecting the axis of rotation thereof, and a picking body 53 comprised of a number of flexible, spaced-apart picking fingers 54 projecting outwardly from surface 56 of element 52. A mounting plate 58 is provided with spaced, opposed, slotted flanges 60 for mounting elements 52 of members 48 on extensions 60 and along the length of support 12 as is clear in FIG. 1. Bolts 62 adjustably mount plates 58 on extensions 50 so that members 48 may be moved toward and away from space 42.

A shaft 64 is coupled to each element 52 respectively for rotatably mounting the latter on plate 58 for movement about an axis substantially transverse to the axes of rotation of elements 24. A guide plate 66 is carried by plate 58 and serves the same purpose as plate 34. Members 48 are disposed so that the outer, free ends of fingers 54 will engage a bird within space 42. For purposes of illustration only, the diameter of each element 24 is slightly greater than the diameter of each element 52 and the number of fingers on each element 24 is greater than the number of fingers 54 on each element 52. Also, for purposes of illustration, fingers 54 are shown inclined slightly with respect to the horizontal, but it is clear that fingers 54 could well be horizontally disposed if desired. Like fingers 26, fingers 54 spin the feathers subjected thereto from the bird as elements 52 rotate and, to assist in this feather removal, fingers 54 are provided with longitudinally spaced, transverse ribs adjacent the free ends thereof for the same reasons as set forth above for fingers 26.

A pulley 68 is rigid to each shaft 64 respectively, and structure in the nature of a flexible, endless belt 70 is trained over corresponding pulleys 68 and a pair of idler pulleys 72 for interconnecting pulleys 68 in a manner such that alternate pulleys rotate in the same direction, whereas pulleys adjacent such alternate pulleys rotate in the opposite direction. A suitable prime mover may be coupled with one of the shafts 64 on each side of space 42 for simultaneously rotating the corresponding elements 52. In FIG. 1, the directions of rotation of adjacent discs 52 are represented by arrows 74 and 76. Elements 52 could, if desired, be rotated independently of each other or in pairs by individual prime movers, and adjacent elements 52 need not be rotated in opposite directions.

A third set of picking members 78 is disposed above members 48 and inwardly of the latter relative to space 42. Members 78 are adjustably carried by a pair of spaced beams 80 on each side of the path of travel of bird 44 and at each end of support 12. Beams 80 may form a part of base 14 or be of independent structure as desired.

Each member 78 is similar in all respects to members 22 and 48 and includes a rotatable, disc-like element 82 having a surface 86 intersecting the axis of rotation thereof, and a picking body 83 comprised of a number of flexible, spaced-apart picking fingers 84 projecting outwardly from surface 86 of element 82 toward the path of travel of bird 44. The distance between the outer, free ends of fingers 84 on opposed sides of the path of travel of bird 44 is substantially less than the distance between the free ends of fingers 54 on opposed sides of the path. Like fingers 26 and 54, fingers 84 spin the feathers subjected thereto from the bird as elements 82 rotate and, to assist in this feather removal, fingers 84 are provided with longitudinally spaced, transverse ribs adjacent the free ends thereof for the same reasons as set forth above with respect to fingers 26.

Figure 3:
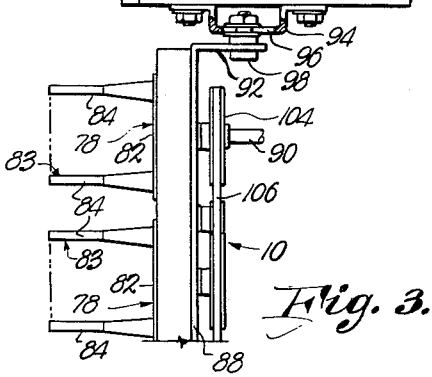
FIG. 3 is a fragmentary, top plan view taken along line 3—3 of FIG. 2.

A mounting plate 88 extends longitudinally of support 12 and rotatably mounts a series of shafts 90, each rigid to a corresponding element 82 for mounting the latter for rotation on plate 88 about an axis transverse to the axes of rotation of elements 24. Each plate 88 is provided with a substantially triangular flange 92 thereon at each end thereof for mounting plate 88 to the corresponding beam 80. A bracket 94 having a central slot 96 therein adjustably mounts flange 92 to beam 80 to permit plate 88 to move toward and away from the path of travel of bird 44. As shown in FIG. 3, a trunnion 98 carried by each flange 92, is received within the corresponding slot 96. By virtue of trunnion 98, plate 88 may be tilted about the axis of trunnion 98 so as to tilt fingers 84 relative to the path of travel of bird 44. The ends of bracket 94 are provided with transverse slots 100 which receive bolts 102 and which in turn are releasably secured to the corresponding beam 80 as is clear in FIG. 3. By virtue of this construction, members 78 may be raised and lowered with respect to base 14.

A pulley 104 is rigid to each shaft 90 respectively, and structure in the nature of a flexible belt 106 is coupled with pulleys 104 and a pair of idler pulleys 108 in a manner such that alternate pulleys 104 will rotate in one direction while at the same time pulleys adjacent such alternate pulleys will rotate in the opposite direction. A suitable prime mover may be coupled with one of the shafts 90 on each side of the path of travel of bird 44 to simultaneously rotate the corresponding elements 82. Elements 82 could, if desired, be rotated independently of each other or in pairs by individual prime movers, and adjacent elements 82 need not be rotated in opposite directions.

Conveying means 46 includes a shackle 110 having leg-receiving notches 112 therein and disposed to pass between a pair of guide bars 114 to prevent rotation of shackle 110. Shackle 110 is in turn coupled with an overhead conveyor of conventional construction so that shackle 110 moves longitudinally of support 12 at a predetermined speed.

The circular forces applied to and along the feathers of bird 44 by the rotating fingers 26, 54 and 84 are frictional in character and serve to pull the feathers from the bird by the frictional engagement with the feathers and by the intertwining action of the fingers and feathers. As the feathers are removed from the bird, they will be thrown outwardly and downwardly by the rotation of fingers 26. In this respect, machine 10 is substantially self-cleaning and means may well be provided for removing the feathers collected from the birds processed by machine 10. Those feathers clinging to members 22, 48 and 82 may be removed therefrom by a suitable spray after the picking operation.

In operation, bird 44 is suspended by its legs from shackle 110 in such a manner that the body of bird 44 is at least partially supported by fingers 26. This permits bird 44 to shift about substantially in all directions as the bird is conveyed by shackle 110 longitudinally of support 12. Fingers 26 engage the neck and the upper back portions of bird 44 to remove the feathers therefrom. Fingers 54 on opposed sides of space 42 are disposed for engaging the remaining parts of the body of the bird and also the wings thereof to in turn remove the feathers from these regions. Fingers 84 are disposed for removing the feathers from the legs of the bird and especially from the hock areas thereof. Since the legs of the bird project slightly outwardly from one side of shackle 110, the legs of the bird will be received between the fingers 84 projecting inwardly from one side of space 42 as shown in FIG. 2. Substantially all of the surface of the legs will thus be contacted by the fingers since only limited twisting of the legs of the bird 44 is had especially in the area next adjacent the region where the legs couple with the shackle 110.

The reverse rotation of the various fingers along the length of support 12 causes bird 44 to shift about within space 42 and from side-to-side against fingers 54 and 84. Thus, substantially the entire area of the bird is contacted by fingers 26, 54 and 84, and as a result all of the feathers are removed from the bird. Since bird 44 is supported partially by fingers 26 and is substantially free to move to a limited degree in all directions, bird 44 has a tendency to move downwardly and outwardly through the junction between fingers 26 and the proximal fingers 54. However, due to the flexibility of the free ends of these fingers, centrifugal force will deflect fingers 26 and 54 outwardly to in effect, close the gap between members 22 and 48 to thereby prevent the bird from being lodged therebetween. The deflections of fingers 26, 54 and 84 are shown in dashed lines in FIG. 2.

To accommodate birds of different sizes, support 12 may be moved upwardly or downwardly with respect to base 14 so as to shift fingers 26 and 54 in the same direction. Also, fingers 54 and 84 may be moved toward or away from the path of travel of bird 44 and additionally, fingers 84 may be pivoted about the axes of trunnions 98.

It has been found that substantially all of the feathers of bird 44 are removed therefrom after the bird has travelled the length of support 12. Thus, reverse picking of feathers, as is required in conventional picking machines, is obviated and the time and labor that is saved with the use of machine 10 reduces the over-all cost of the poultry picking operation.

Although elements 24, 52 and 82 have been described as being disc-like in construction, it is clear that they may be of any construction and the corresponding surfaces 27, 56 and 86 thereof may be of any configuration, such as concave, convex or undulating, and need not necessarily be flat as illustrated.

Another manner of driving the various disc-like elements is shown in FIG. 5 and may be used in lieu of the belt and pulley systems described hereinabove. For purposes of illustration, three disc-like elements 200, having outwardly projecting picking fingers 202 thereon are mounted for rotation on a fixed support 204 by bearing means (not shown) similar in all respects to bearing means 32. Each element is provided with a shaft 206 coupled with the corresponding bearing means, shaft 206 projecting through support 204 and extending outwardly from the opposite face thereof.

A spur gear 208 is provided for each shaft 206 respectively, and is rigid thereto on the side of support 204 opposite to the side adjacent which the corresponding element 200 is disposed.

Each pair of adjacent spur gears 208 are in mesh with each other and one of the shafts 206 of a bank of aligned elements 200 is connected with a suitable prime mover so that, upon actuation of the prime mover, all of the spur gears 208 will rotate in the proper direction inasmuch as the spur gears 208 are all connected together. Since each spur gear 208 is in mesh with the spur gears 208 on opposed sides thereof, one spur gear will rotate in one direction, while the adjacent spur gear will rotate in the opposite direction. This assures that the corresponding elements and thereby the respective fingers 202 will rotate in opposed directions.

Spur gears utilized in the manner shown in FIG. 5, can be employed to replace pulleys 36 and belt 38, pulleys 68 and belts 70, and pulleys 104 and belts 106. Moreover, a single prime mover could be utilized for all sets of gear systems of machine 10, or a single prime mover could be provided for each group of gears respectively. If used in the last-mentioned manner, a prime mover preferably is coupled to a shaft 206 of a spur gear 208 substantially midway between the ends of a bank of such gears to equalize the load applied by the prime mover to the gear 208 coupled therewith.

Having thus described the invention, what is claimed as new and desired to be secured by Letters Patent is:

1. The method of picking feathers from a bird comprising:
   suspending a bird by its legs;
   conveying the suspended bird along a predetermined path of travel;
   applying a plurality of first, aligned sets of forces to the body and wings of the bird from each side of its path respectively with the line of action of each force of said first sets being circular and along the bird to spin the feathers from the body and wings thereof as the bird moves along said path;
   applying a series of second, aligned sets of forces to the legs and back areas of the bird from each side of said path respectively as said first sets of forces are applied to the body and wings of the bird with the line of action of each force of said second sets being circular and along the bird to spin the feathers from the legs and hock areas thereof; and
   applying a number of third, aligned sets of forces to the upper back portions and neck of the bird from beneath the latter as said first and second sets of forces are applied thereto with the line of action of each force of said third sets being circular and along the bird to spin the feathers from the upper back portions and neck thereof, each of said first, second and third sets of forces having a respective axis of rotation transverse to said path with the axes of said first and second sets being transverse to the axes of said third sets, the forces of each of each set being exerted in a rotative direction opposite to the rotative direction in which the forces of the aligned set next adjacent thereto is exerted, whereby the bird is shifted about by the forces applied thereto.

2. The method of picking feathers as set forth in claim 1, wherein the forces of said sets define the sides and bottom boundaries of an elongated picking zone through which the bird is moved, and wherein is included the steps of:
   adjusting the size of said picking zone to the size of the bird; and
   restricting the bird to said zone as the latter is subjected to said forces and shifted about thereby.

3. The method of picking feathers as set forth in claim 1, and wherein is included the step of:
   partially supporting the bird from beneath as the same moves along said path.

4. The method of picking feathers from a bird comprising:

suspending a bird by its legs;

partially supporting the suspended bird from beneath;

applying a pair of first sets of forces to the body and wings of the bird when the latter is disposed between said first sets with the line of action of each force of said first sets being circular and along the bird to spin the feathers from the body and wings thereof;

applying a pair of second sets of forces to the legs and hock areas of the bird as said bird is disposed between said second sets and as said first sets of forces are applied to the body and wings of the bird with the line of action of each force of said second sets being circular and along the bird to spin the feathers from the legs and hock areas thereof; and applying a third set of forces to the upper back portions and neck of the bird from beneath the latter as said first and second sets of forces are applied thereto with the line of action of each force of said third set being circular and along the bird to spin the feathers from the upper back portions and neck thereof, each of said first, second and third sets of forces having a respective axis of rotation, the axes of said first and second sets being transverse to the axis of said third set, whereby the bird is shifted about by the application of said forces thereto.

References Cited by the Examiner

UNITED STATES PATENTS

| | | | |
|---|---|---|---|
| 2,444,556 | 7/1948 | Drews | 17—11.1 |
| 2,571,034 | 10/1951 | Harvey | 17—11.1 |
| 2,777,158 | 1/1957 | Pitts et al. | 17—11.1 |
| 2,777,159 | 1/1957 | Pitts et al. | 17—11.1 |
| 2,782,457 | 2/1957 | Lentz et al. | 17—11.1 |
| 3,122,778 | 3/1964 | Crane et al. | 17—11.1 |

SAMUEL KOREN, *Primary Examiner.*

LUCIE H. LAUDENSLAGER, *Assistant Examiner.*